United States Patent [19]

Hansel et al.

[11] Patent Number: 5,076,823
[45] Date of Patent: Dec. 31, 1991

[54] PROCESS FOR CRYOGENIC AIR SEPARATION

[75] Inventors: James G. Hansel, Emmaus; Brian R. Dunbobbin; Barry L. Werley, both of Allentown, all of Pa.

[73] Assignee: Air Products and Chemicals, Inc., Allentown, Pa.

[21] Appl. No.: 496,844

[22] Filed: Mar. 20, 1990

[51] Int. Cl.[5] .............................. F25J 3/02; F25J 3/04
[52] U.S. Cl. ............................................ 62/22; 62/18; 62/24; 62/36; 62/42; 62/44
[58] Field of Search ................... 62/18, 22, 24, 36, 42, 62/44; 261/112.2

[56] References Cited

U.S. PATENT DOCUMENTS

| | | | |
|---|---|---|---|
| 4,623,454 | 11/1986 | Tauscher et al. | 261/112.2 X |
| 4,813,988 | 3/1989 | Bennett et al. | 62/18 |
| 4,836,836 | 6/1989 | Bennett et al. | 62/22 |
| 4,838,913 | 6/1989 | Victor et al. | |
| 4,842,625 | 6/1989 | Allam et al. | 62/22 |
| 4,871,382 | 10/1989 | Thorogood | 62/22 X |
| 4,921,641 | 5/1990 | Lavin | 261/112.2 |
| 4,929,399 | 5/1990 | Lockett et al. | 261/112.2 |
| 4,981,621 | 1/1991 | Pluss | 261/112.2 |
| 4,983,194 | 1/1991 | Hopkins et al. | 62/22 |

OTHER PUBLICATIONS

ASTM Designation G94-88, "Standard Guide for Evaluating Metals for Oxygen", pp. 12-20.

Primary Examiner—Henry A. Bennet
Assistant Examiner—Christopher B. Kilner
Attorney, Agent, or Firm—Russell L. Brewer; James C. Simmons; William F. Marsh

[57] ABSTRACT

This invention relates to an improved process for the cryogenic separation of air and particularly with respect the separation of air in oxygen enriched zones within a distillation column. The improvement resides in utilizing aluminum packing in structured or random form in the oxygen enriched zones wherein the oxygen concentration ranges from about 80 to 96% by volume and optionally a sheet copper packing of structured or random form in the oxygen enriched zones, wherein the oxygen concentration is greater than 97% by volume. The aluminum packing may also be used in an argon column where argon is separated from oxygen by distillation.

9 Claims, 1 Drawing Sheet

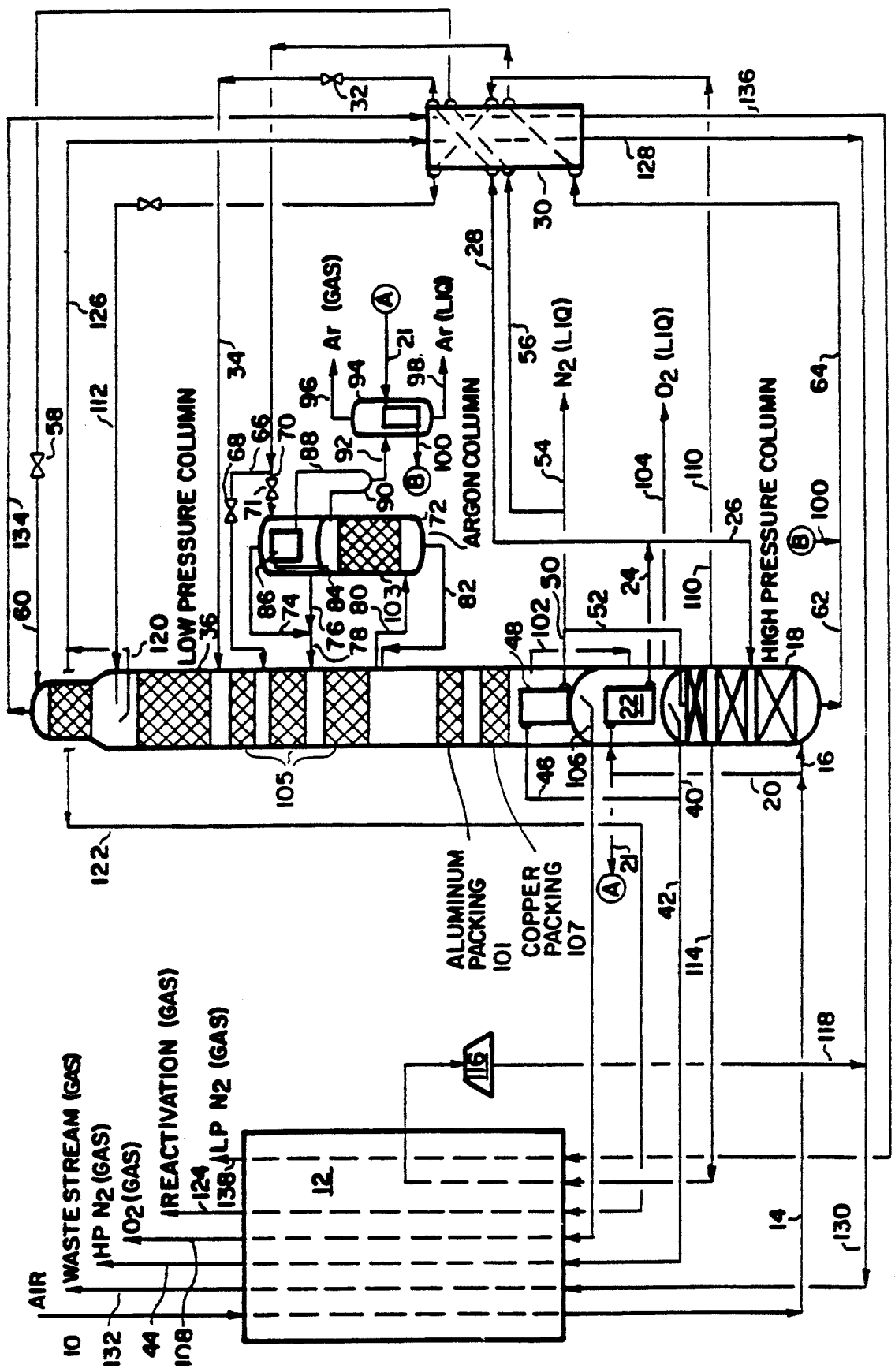

PROCESS FOR CRYOGENIC AIR SEPARATION

TECHNICAL FIELD

This invention relates to an air separation process and particularly to a distillation process associated with the separation of air into its components.

BACKGROUND OF THE INVENTION

In the cryogenic separation of air, feed air is compressed, cooled and then a portion usually isenthalpically or isentropically expanded to effect further cooling and thereby generating a liquid. The liquid typically is charged to a double distillation column having a high pressure and a low pressure section wherein the resulting liquidfied air is separated. High purity oxygen is generated in the low pressure section and withdrawn as a liquid. Often argon is recovered as a component and typically that will involve removing an oxygen enriched sidestream from the low pressure column to an argon column for further separation. Other separation cycles including single columns also are used for the separation of air into its components.

Recently there has been substantial activity in improving the distillation process associated with the separation of oxygen and nitrogen through the use of packings as opposed to trays in the distillation column. Structured packings have been suggested for the purpose of facilitating separation with reduced pressure drop in the column.

Representative patents which describe air separation processes using structured packing for enhancing distillation through enhanced mass transfer with reduced pressure drop in the column are as follows:

U.S. Pat. No. 4,836,836 discloses an improved cryogenic distillation system for separating air into its components. The invention resided in replacing trays within a distillation column with structured packing in those regions of the distillation column where the concentration of argon was in the range from about 0.6 to about 75% by volume. The general suggestion was to substitute packing for the trays in both the high pressure and low pressure section of the column and particularly substituting the packing for trays in a low pressure argon column. There were two primary reasons for the substitution of packings for these trays, one, there was enhanced separation through greater mass transfer, e.g., more theoretical stages for a given space; and two, there was a greater number of stages with reduced or equivalent pressure drop. In the low pressure argon column, minimizing pressure drop across the column was extremely important, because it controls the pressure and thus the bubble point of the reboiling stream.

U.S. Pat. No. 4,838,913 discloses the cryogenic separation of air and recovery of argon in a side column. The patentees point out that vapor-liquid contact is achieved in a low pressure section of a double column utilizing packing in a section of the low pressure column below the intermediate point, i.e., the point relating to the point of removal of gases for argon recovery in the argon column.

The utilization of thin metal sheet for the fabrication of structured and random packing for use in distillation columns designed for the separation of air into its components has presented problems in terms of the selection of materials of construction for packing materials in an oxygen enriched environment. It was known from prior art processes that as oxygen concentration increased, certain materials would not be suited for use as the material of construction. Conventional wisdom suggested copper, brass and stainless steel as being acceptable materials while aluminum was not a recommended material, particularly where aluminum components have a thickness of less than about 0.8 millimeters. Representative literature suggesting suitable materials of construction for trays, packing, etc. for a distillation column used by air separation include:

U.S. Pat. No. 4,813,988 discloses a variety of packing materials for air separation processes and materials of construction for such packings include carbon steel, stainless steel, aluminum, copper alloys and plastics. The general suggestion was that a packing element fabricated from a copper containing material having a concentration of copper of at least about 30% by weight is preferred because of its resistance to flammability. The patentees point out that packing elements present additional problems because of the relatively thin nature of the material and the thin film of liquid that may be retained on the surface of the material.

ASTM Designation G94-88 standard guide for evaluating metals for oxygen service pages 12-20 provides and excellent knowledge base for selecting metals which are suitable and unsuitable for direct oxygen service. Copper and brass are suggested as being preferred.

SUMMARY OF THE INVENTION

This invention relates to an improved process for the cryogenic separation of air and additionally to such cryogenic processing which argon is recovered as a sidestream. The general process comprises compressing a feed air stream, cooling that air stream, typically by expanding that air stream to effect condensation thereof, distilling the condensed air stream in a distillation column generating a nitrogen rich overhead and an oxygen rich bottoms. The improvement in the process comprises utilizing packing material in structured or random form in the distillation column the material of construction for said packing consisting of aluminum and said packing being utilized at least in those zones where the concentration of oxygen is within a range from 80-96% by volume. In a preferred embodiment, a combination of packing elements are used, one consisting of aluminum, and the other packing element consisting essentially of copper and using the copper packing element in zones where the concentration of oxygen is greater than 97% by volume.

It has been found that aluminum, as opposed to brass, stainless steel or other commonly used materials may be used for direct oxygen service. Surprisingly, aluminum, an industry non-recommended material for direct oxygen service in thin sheet form, has been found to be one of the few materials in thin sheet form that can be used as a packing. Aluminum in packing configuration has been found to be nonflammable in direct oxygen service up to about 97.5% oxygen by volume. In contrast, the industry standards, brass and stainless steel, which are suggested as being suitable for direct oxygen service are unsuited in thin sheet packings because of flammability. Since aluminum can be used as a packing material in direct oxygen service, several additional advantages can be achieved. These are:

an ability to use thin packing materials rather than the normally structurally thicker trays to obtain reduced pressure drop through the column with enhanced mass transfer;

an ability to take advantage in the ease of installation and metal compatibility of aluminum packing for use in the distillation column;

an ability to take advantage of the lightweight inherent in an aluminum fabricated material, thereby reducing capital costs associated with the distillation column; and an ability to take advantage of increased packing heights through the decreased weight of the packing element consisting of aluminum.

BRIEF DESCRIPTION OF THE DRAWING

The drawing is a schematic diagram of a typical three column air separation process for producing argon and oxygen products.

DETAILED DESCRIPTION OF THE INVENTION

The present invention relates to an improvement to a process and apparatus for the separation of mixtures comprising oxygen, nitrogen and argon, e.g. air, by cryogenic distillation. Essentially, the improvement of the present invention is the use of a structured or random packing constructed from aluminum in place of distillation trays in at least those regions of the distillation column system where the oxygen concentration is in the range of about 80 to 96% percent by volume and where the densitmetric superficial gas velocity is at least 0.06 ft/sec.

In the cryogenic separation of air to produce nitrogen, oxygen and argon products a three column distillation system is normally used. These three columns are called the high pressure column, the low pressure column and the argon column. Examples of air separation processes which separate argon and oxygen and produce both as products are shown in U.S. Pat. Nos. 3,729,943; 4,533,375; 4,578,095; 4,604,116; 4,605,427 and 4,670,031, the specifications of which are incorporated herein by reference.

To facilitate understanding of the invention as it pertains to an air separation process for producing oxygen and argon products, reference is made to FIG. 1. With reference to FIG. 1, compressed air, which has been cooled to cooling water temperature and has had impurities which may freeze at cryogenic temperatures, e.g. water and carbon dioxide removed, is fed via line 10 to heat exchanger 12, wherein it is cooled to the stream's dew point. This cooled, compressed, impurity-free air, now in line 14, is then split into two portions. A first portion is fed via line 16 to a lower location in high pressure column 18 typically operating at a pressure from about 30 to 200 psig. A second portion, in line 20, is further split into two fractions. The first fraction is fed to argon product vaporizer 94 via line 21 and the second fraction is fed to and condensed in product vaporizer 22 for providing reboiling of liquid oxygen in the sump and then removed from product vaporizer 22 via line 24. The condensed liquid, in line 24, is then separated into two portions, the first portion is fed as a feed to an intermediate location of high pressure column 18 via line 26 and the second portion, in line 28, which is subcooled in heat exchanger 30, flashed in J-T valve 32, is fed to an intermediate location of low pressure column 36 via line 34. Low pressure column 36 is typically operated at a pressure ranging from 16 to 80 psig.

An overhead is removed from high pressure column 18 via line 40 and then divided into two portions. The first portion is warmed in main heat exchanger 12 to recover refrigeration and then removed as high pressure nitrogen product via line 44. The second portion is fed via line 46 to reboiler/condenser 48 located in the bottom of low pressure column 36 wherein it is condensed and removed via line 50. This condensed pure nitrogen stream is then split into three portions. The first portion is fed via line 52 to the top of high pressure column 18 to provide reflux to high pressure column 18. The second portion is removed as liquid nitrogen product via line 54, and the third portion, removed via line 56, is subcooled in heat exchanger 30, flashed in J-T valve 58 and fed to the top of low pressure column 36 via line 60, to provide an essentially pure nitrogen reflux to the top portion of low pressure column 36.

Oxygen-enriched liquid bottoms from high pressure column 18 is removed via line 62. This stream is combined with stream 100, a condensed air stream from argon product vaporizer 94, to form combined oxygen-enriched liquid stream 64. This combined liquid stream is subcooled in heat exchanger 30 and then split into two substreams. The first substream, line 66, is flashed in J-T valve 68 and fed into an upper-intermediate location of low pressure column 36. The second substream, line 70, is flashed in J-T valve 71 and fed to the sump surrounding condenser 86 located at the top of argon column 72 to provide refrigeration for condenser 86. A gaseous overhead is removed from the overhead portion of the sump via line 74 and is combined with the liquid removed from the sump via line 76 to form combined stream 78. This combined stream 78 is then fed to an intermediate location of low pressure column 36.

A side stream is removed from a lower-intermediate location of low pressure column 36 via line 80 and fed to a lower portion of argon column 72 which operates at a pressure ranging from 16 to 40 psig. The bottoms from argon column 72 is returned to low pressure column 36 via line 82 at the same location as the side stream 80 draw in order to provide intermediate column reflux. Overhead argon is removed from argon column 72 via line 84, condensed in condenser 86 and split into two portions. The first portion is returned to the top of argon column 72 via line 90 to provide reflux to argon column 72. The second portion is removed and fed via line 92 to argon product vaporizer 94. Argon gas product is removed from product vaporizer 94 via line 96 and argon liquid product is removed from product vaporizer 94 via line 98.

A bottoms liquid stream is removed from low pressure column 36 (the bottom sump surrounding reboiler/condenser 48) and fed to the sump surrounding product vaporizer 22 via line 102. Gaseous oxygen product is removed from the overhead of the sump surrounding product vaporizer 22 via line 106, warmed to recover refrigeration in main heat exchanger 12 and removed as gaseous oxygen product via line 108. A liquid oxygen product is removed from a lower portion of the sump surrounding product vaporizer 22 as liquid oxygen product via line 104.

A liquid side stream is removed via line 110 from an intermediate location of high pressure column 18. This impure liquid side stream is subcooled in heat exchanger 30, reduced in pressure and fed as reflux an upper portion of low pressure column 36 via line 112. In addition, a gaseous side steam is removed via line 114 from a similar location of high pressure column 18. This side stream is warmed in main heat exchanger 12 to recover refrigeration and generally work expanded in expander 116 to recover refrigeration. This expanded stream is now in stream 118.

A gaseous side stream is removed via line 120 from an upper location of low pressure column 36 and split into two portions. The first portion, in line 122, is warmed in heat exchanger 12 to recover refrigeration, used as reactivation gas and removed from the process via line 124. Reactivation gas is necessary to reactivate a mole sieve adsorption unit which is used to remove water and carbon dioxide from compressed feed air. If reactivation gas is unnecessary, then stream 124 would be vented to the atmosphere as waste. The second portion of the side stream, line 126, is warmed in heat exchanger 30 to recover refrigeration and combined with expanded stream 118 to form combined stream 130. This combined stream 130 is then warmed in heat exchanger 12 to recover any residual refrigeration and vented as waste via line 132.

Finally, an overhead from low pressure column 36 is removed via line 134 and warmed in heat exchanger 30 to recover refrigeration. This warmed overhead, now in line 136, is further warmed in heat exchanger 12 to recover any residual refrigeration and removed as low pressure nitrogen product via line 138.

The solution with respect to reduced risk of flammability hazards as well as obtaining other benefits in this air separation process is the use of structured or random packing of aluminum in select zones and optionally the use of copper packing in select zones. By the term structured, it is meant a packing comprised of thin metal sheets (usually less than 0.8 mm in thickness) which will promote liquid and/or vapor mixing in a direction perpendicular to the primary flow direction. Examples of ordered or structured packings are disclosed in U.S. Pat. Nos. 4,128,684; 4,186,159; 4,296,050; 4,455,339; 4,497,751; 4,497,752 and 4,497,753, the specifications of which are incorporated herein by reference. Random packings of aluminum may comprise ¼ to 1-inch strips of less than 0.8 mm (preferably 0.05 to 0.4 mm) in thickness and rings or helixes of thin sheet (0.8 mm or less) having no prearranged structure; i.e., random structure.

The key to obtaining the advantages of this invention, as stated, is to utilize thin sheet packing material constructed of aluminum as the principal component and place these packing materials in direct oxygen service in the low pressure column or argon column at least at a point where the oxygen concentration ranges from 80-96% by volume, preferably and near the sump area for reboiler/condenser 48 and other sections of the low pressure column 36. Preferably, the aluminum packing is used with a range from 92-96%. In the drawing, the aluminum packing is referenced as 101. In addition, aluminum packing (referenced as 103) is used at least in zones of the argon column where the oxygen concentration ranges less than 96% by volume. For maximum efficiency, it is suggested that aluminum packing (referenced as 105) be utilized in all zones where the concentration of oxygen by volume is less than about 96%.

In a preferred embodiment, a packing material 107 constructed essentially of copper; e.g., preferably greater than 95% by weight of copper is utilized in the sump area nearest product vaporizer 22, wherein the oxygen concentration is greater than 96% by volume. A copper based packing provides increased resistance to flammability in the column and when transitioned with aluminum packing at about 96-97%, oxygen by volume does not detract from the overall advantages achieved through the use of aluminum.

The following examples are intended to facilitate an understanding of the invention and are not intended to restrict the scope thereof.

EXAMPLE 1

Flammability Hazards Testing

The general experimental procedure was to install a sample of packing with an ignitor pill of thermite embedded in the interior of the packing, inside a reactor vessel. For gas phase experiments, a dry gas supply comprising oxygen, nitrogen, argon, or mixtures thereof, was fed to the vessel and its oxygen content measured with a paramagnetic analyzer. The reactor pressure was then adjusted to the desired level. The ignitor was set off by applying direct current through an embedded nichrome wire. For liquid oxygen/argon experiments, a liquid mixture was first made to the desired oxygen concentration by mixing liquid oxygen and liquid argon in a dewar. The concentration was then confirmed by taking both liquid and vapor samples for analysis in the paramagnetic oxygen analyzer. Upon achieving the desired concentration, the mixture was poured into the vessel, which was closed and allowed to pressurize. The pressure in the vessel was monitored throughout the test via a transducer and recorder.

Four materials of construction for structured packing were evaluated. These were copper, brass, aluminum, and 304 stainless steel. Each test result was evaluated to determine whether propagation of combustion did or did not occur. The preferred indication of propagation of combustion was complete destruction of the specimen. In those cases in which specimens were not completely destroyed, the degree of propagation, if any, was noted. Table 1 sets forth the gas and liquid propagation data for the tests. Packing thicknesses are recited with the sample. Table 2 provides results for the propagation of combustion for materials versus oxygen concentration. The percent oxygen values reported define the upper oxygen concentration limit for the materials in the group.

TABLE 1

| | | PACKING TEST RESULTS | | | |
|---|---|---|---|---|---|
| | | NUMBER OF PROPAGATIONS | | NUMBER OF NONPROPAGATIONS | |
| MATERIAL | % O2/Ar | GAS | LIQ | GAS | LIQ |
| Copper Packing | 99.9-99.99+ | | | 4 | 2 |
| (0.125 mm) | 99.8-99.9 | | | 3 | |
| Brass Packing | 99.9-99.99+ | 10 | | 2 | |
| (0.1 mm and 0.2 mm) | 99.8-99.9 | 9 | | 6 | 1 |
| | 99.4-99.5 | 1 | | | |
| | 92.8 | 1* | | | |
| | 92.7 | | | 1 | |
| | 89.8 | | | 1 | |

TABLE 1-continued

PACKING TEST RESULTS

| MATERIAL | % O2/Ar | NUMBER OF PROPAGATIONS | | NUMBER OF NONPROPAGATIONS | |
|---|---|---|---|---|---|
| | | GAS | LIQ | GAS | LIQ |
| Stainless Steel | 99.87 | 2 | | | |
| Packing and Strips | 90.0 | 1 | | | |
| (0.2 mm) | 88.0** | 1 | | | |
| | 87.0** | 1 | | | |
| | 86.0** | | | 1 | |
| Stainless Steel | 90.** | | 1 | | |
| Packing and Strips | 70.** | 1* | 2* | | |
| (0.1 mm) | 61.** | | | | 1 |
| | 60.** | | | 2 | |
| Aluminum Packing | 99.9-99.99+ | 7 | 3 | 8 | 1 |
| (0.2 mm) | 99.8-99.9 | | 3 | 8 | 10 |
| | 99.7-99.8 | | | 12 | 1 |
| | 99.64 | | | 5 | |
| | 99.3-99.4 | | | | 2 |
| | 99.2-99.3 | | | | 2 |
| | 99.1-99.2 | | 1 | 1 | 3 |
| | 98.9-99.0 | | | 3 | 3 |
| | 98.3-98.4 | | 1 | | |
| | 97.6-97.8 | | 1 | - 2 | 1 |
| | 97.4+-97.6 | | 1* | | 3 |
| | 97.4 | | | | 2 |
| | 96.6--97.0 | | | | 5 |
| | 95.2 | | | 1 | |
| | 95.1 | | | 2 | |
| | 92.-95. | | | 1 | 3 |
| | 90.-92 | | | | 1 |
| | 87. | | | | 2 |
| | 81.2 | | | | 1 |

*The threshold is established by the lowest concentration in which a propagation resulted.
**published data for 0.5" by 6" strips.

TABLE 2

REGIONS OF NON-PROPAGATION OF COMBUSTION VS. OXYGEN CONCENTRATION DIAGRAM FOR STRUCTURED PACKING MATERIALS

| Packing Materials that do not propogate combustion | Copper Brass Stainless Steel Aluminum | Copper Brass Aluminim | Copper Aluminum | Copper |
|---|---|---|---|---|
| Upper Limit Percent Oxygen | 67% | 92.7% | 97.4% | 99.99% |

The following is a commentary on the results recorded in Tables 1 and 2.

COPPER TESTS

Copper effectively resisted propagation of combustion under all test conditions including 99.99% oxygen at 55 psia.

BRASS TESTS

Brass compositions of 63% copper, 37% zinc exhibited a threshold for propagation of combustion (defined as the oxygen concentration at which propagation of combustion occurred) at gas concentrations of 92.7% oxygen at 55 psig. Combustion of the brass occurred regardless of the orientation of the sample and combustion velocities ranging from 1" per second for upward propagation to about 4" per second for downward propagation were observed. Upward propagation was initiated by placing the ignitor about 1" from the bottom of a vertical 6" long sample and downward propagation by placing the ignitor about 1" from the top of a 6" sample. These results for thin sheet packing appear in conflict with prior art reported test results where the samples were in the form of brass rods at 25 psia and brass strips at 1500 psia which showed no propagation of combustion in 99.99% gaseous oxygen. The unexpected showing of brass in these packing tests is believed to be the result of adiabatic conditions present in the packing samples and the low pressures used in these tests in contrast to 1500 psia. These conditions were sufficient to allow the more volatile zinc component of the brass to vaporize and promote unexpected propagation of combustion.

ALUMINUM TESTS

In room temperature gaseous oxygen tests (summarized in Table 1), a propagation of combustion threshold of 99.98% oxygen at 55 psia was obtained. Using 99.99+% oxygen, the sample was totally consumed only if ignition was generated at the top of a vertical sample. Unexpectedly, propagation of combustion upwards did not occur when ignition was generated at the bottom of a vertical sample. In contrast to brass the adiabatic conditions and low pressure did not appreciably alter the characteristics of thin sheet aluminum to thick sheet aluminum as experienced in trays. In other words the aluminum packing, unlike other metals when used as packing, exhibited no substantial change in direct oxygen service. Enhanced conductivity and reflectively of aluminum vis-a-vis other metals may provide an explanation.

When aluminum samples were partially immersed in a pool of liquid oxygen and the ignitor placed above the liquid level, unexpected strong energy releases were obtained and significant combustion propagation was observed in liquid oxygen (LOX) concentrations above 97.4% oxygen in argon. The energy releases were sufficiently powerful to cause significant damage to the reactor vessel.

When liquid oxygen was distributed over the packing as a thin film (rather than standing the sample in a liquid oxygen pool) combustion occurred, but no strong energy releases occurred and the threshold of combustion propagation was the same as in the all gaseous oxygen tests.

STAINLESS STEEL TESTS

Complete combustion of the 0.2 mm thickness 304 stainless steel packing matrix was observed in tests between 87.0% and 99.87% oxygen at 30 psig. However, published single strip data indicates that 0.2 mm material may have a combustion propagation threshold as low as 67% oxygen in argon at 40 psig. As with brass, stainless steel exhibited a lower propagation threshold than aluminum.

SUMMARY OF RESULTS

The results indicate that copper did not propagate combustion in high-purity oxygen, aluminum packing did not propagate below a 99.8% oxygen concentration in oxygen vapor and 97.4% in oxygen liquid (with explosive violence under some liquid oxygen propagating conditions), brass did not propagate below about 92.7% oxygen, and that stainless steel did not propagate below about 67% in oxygen vapor or liquid.

The high degree of flammability of brass packing in contrast to brass strips and rods was unanticipated because of the known non-flammability of brass strips and brass rods. In the case of the brass the adiabaticity, absorptivity or emissitivity and high surface area of the packing may permit sufficient heating of the thin metal to vaporize the zinc within the brass. Zinc vapors will burn and may release sufficient energy to melt the copper (balance of the brass) to, in effect, burn the packing.

We claim:

1. In a process for the cryogenic separation of air which comprises compressing a feed air stream, cooling that air stream to effect condensation thereof, distilling at least a portion of the condensed air stream in a distillation column having vapor-liquid contacting means therein and thereby generating a nitrogen rich overhead and an oxygen rich bottoms, the improvement for enhancing separation with minimum pressure drop through the column which comprises utilizing a packing in structured or random form fabricated from aluminum sheet of less than 0.8 mm thickness for reducing the hazard with respect to flammability of the packing as said vapor-liquid contacting means, said packing being placed in a zone where the concentration of oxygen is within a range from about 80 to 96 percent by volume.

2. The process of claim 1 further comprising the utilization of a packing consisting of copper in a zone where the concentration of oxygen is greater than 96%.

3. The process of claim 1 wherein the distillation column is a double column consisting of a high pressure column and a low pressure column mounted above the high pressure column and the packing is placed in a zone nearest a sump in the bottom of the low pressure column.

4. The process of claim 3 wherein the aluminum sheet has a thickness of from 0.05 to 0.4 mm.

5. The process of claim 3 wherein a copper packing is placed in a zone near the sump in the low pressure column having an oxygen concentration greater than 97% oxygen by volume.

6. The process of claim 5 wherein the aluminum packing transitions to copper packing at an oxygen concentration of about 96–97% by volume.

7. The process of claim 3 further including the step of withdrawing a side stream from an intermediate location of the low pressure column and charging to an argon distillation column for separation of argon and utilizing an aluminum packing within said argon distillation column at a point where the concentration of oxygen is less than about 96% by volume.

8. The process of claim 7 where copper packing is utilized in said argon column at a point where the concentration of oxygen is greater than about 97% oxygen by volume.

9. The process of claim 8 wherein the aluminum packing transitions to copper packing in the argon column at an oxygen concentration of about 96–97% by volume.

* * * * *